US007277843B1

(12) United States Patent
Wen et al.

(10) Patent No.: US 7,277,843 B1
(45) Date of Patent: Oct. 2, 2007

(54) METHOD FOR REAL-TIME AUTO-DETECTION OF OUTLIERS

(75) Inventors: Han C. Wen, San Jose, CA (US); Tomas J. Pavel, San Jose, CA (US)

(73) Assignee: Network Physics, Mountain View, CA (US)

( * ) Notice: Subject to any disclaimer, the term of this patent is extended or adjusted under 35 U.S.C. 154(b) by 680 days.

(21) Appl. No.: 10/195,905

(22) Filed: Jul. 15, 2002

(51) Int. Cl.
*G06F 13/10* (2006.01)
*G06F 13/12* (2006.01)
(52) U.S. Cl. ......................................... 703/21; 709/224
(58) Field of Classification Search ................. 703/21; 709/223, 224, 226
See application file for complete search history.

(56) References Cited

U.S. PATENT DOCUMENTS

| | | | | |
|---|---|---|---|---|
| 6,363,933 | B1* | 4/2002 | Berthon-Jones | 128/204.23 |
| 6,529,811 | B2* | 3/2003 | Watson et al. | 701/45 |
| 6,708,137 | B2* | 3/2004 | Carley | 702/179 |
| 6,724,834 | B2* | 4/2004 | Garrett et al. | 375/317 |
| 2003/0039212 | A1* | 2/2003 | Lloyd et al. | 370/235 |
| 2003/0191837 | A1* | 10/2003 | Chen | 709/224 |
| 2004/0092809 | A1* | 5/2004 | Decharms | 600/410 |
| 2004/0172228 | A1* | 9/2004 | Aragones | 703/8 |

OTHER PUBLICATIONS

Dokas et al. (2002 Paper) teaches a data mining for network intrusion detection p. 21-30.*

Floyd Bullard, "A Brief Introduction to Bayesian Statistics", pp. 1-14, NCTM 2001.
Tianhang Hou, Lloyd C. Huff, and Larry Mayer, "Automatic Detection of Outliers in Multibeam Echo Sounding Data", University of New Hampshire, pp. 1-12.
Igor V. Cadez and P.S. Bradley, "Model BAsed Population Tracking and Automatic Detection of Distribution Changes" pp. 1-8.
Edwin M. Knorr and Raymond T. Ng, "A Unified Approach for Mining Outliers", Universityof British Columbia, pp. 1-13.
Mark Last and Abraham Kandel, Automated Detection of Outliers in Real-World Data, pp. 1-10.
Dantong Yu, Gholam Sheikholeslami and Aidong Zhang, "Find Out: Finding Outliers in Very Large Datasets", University of New York at Buffalo, pp. 1-19.

(Continued)

*Primary Examiner*—Paul Rodriguez
*Assistant Examiner*—Andre Pierre-Louis
(74) *Attorney, Agent, or Firm*—Blakely, Sokoloff, Taylor & Zafman LLP

(57) ABSTRACT

A moving window of data is used to determine a local baseline as a moving average of the data weighted by the number of measurements in each time interval. A next measurement associated with a next time interval is compared to a value associated with the baseline to determine an outlier. In some cases, for example where the time series of the data shows small variability around a local mean, the next measurement is compared to a multiple of the weighted moving average to determine an outlier. In other cases, for example where the time series of the data shows significant variability around the local mean, the next measurement is compared to the sum of the weighted moving average and a multiple of a moving root mean square deviation value weighted by the number of measurements in each time interval and in some cases, a damping factor.

32 Claims, 2 Drawing Sheets

OTHER PUBLICATIONS

Hiroyuki Ohsaki, Mitsushige Morita and Masayuki Murata, "Measurment-Based Modeling of Internet Round-Trip Time Dynamics using System Identification", pp. 1-20.

Polly Huang, Anja Feldmann and Walter Willinger, "A non-intrusive, wavelet-based approach to detecting network performance problems", pp. 1-15.

Matthew Mathis, Jeffrey Semke and Jamshid Mahdavi, "The Macroscopic Behavior of the TCP Congestion Avoidance Algorithm", ACM SIGCOMM, vol. 27, No. 3, (Jul. 1997), pp. 1-16.

Nevil Brownlee and Chris Loosley, "Fundamentals of Internet Measurement: A Tutorial" Keynote, (May 1, 2001) pp. 1-14.

M. Mathis and M. Allman, RFC 3148 "A Framework for Defining Empirical Bulk Transfer Capcity Metrics", Internet Society (Jul. 2001), pp. 1-16.

G. Almes, S. Kalidindi and M. Zekauskas, RFC 2681 "A Round-Trip Delay Metric for IPPM", Internet Society (Sep. 1999), pp. 1-20.

G. Almes, S. Kalidindi and M. Zekauskas, RFC 2680 "A One-Way Packet Loss Metric for IPPM", Internet Society (Sep. 1999), pp. 1-15.

G. Almes, S. Kalidindi and M. Zekauskas, RFC 2679 "A One-Way Delay Metric for IPPM", Internet Society (Sep. 1999), pp. 1-20.

J. Mahdavi and V. Paxson, RFC 2498 "IPPM Metrics for Measuring Connectivity", Internet Society, (Sep. 1999), pp. 1-10.

V. Paxson et al., RFC 2330 "Framework for IP Performace Metrics" Internet Society, (May 1998), pp. 1-40.

Vern Paxson, "End-to-End Routing Behavior in the Internet", University of California, (May 23, 1996), pp. 1-23.

"Handbook for Statistical Analysis of Environment Background Data", Naval Facilities Engineering Command, (Jul. 1999), pp. 1-83.

Surendra P. Verma, "Sixteen Statistical Tests for Outlier Detection and Rejection in Evaluation of International Geochemical Reference Materials: Example of Microgabbro PM-S", Geostandards Newsletter, vol. 21, No. 1, (Jun. 1997), pp. 59-75.

Kenneth C. Glossbrenner, Approved Text for new Recommendation I.380: "Internet Protocol Data Communication Service—IP Packet Transfer and Availability Performance Parameters", (May 3, 1999), pp. 1-28.

V. Raisanen, G. Grotefeld & A. Morton, draft-ietf-ippm-npmps-07 "Network Performance measurement With Periodic Streams", Internet Society, pp. 1-31.

Rajeev Koodli & R. Raukanth draft-ietf-ippm-loss-pattern-07, "One-Way Loss Pattern Sample Metrics", Internet Society IPPM Working Group, (Mar. 28, 2002), pp. 1-23.

C. Demichelis & P. Chimento draft-ietf-ippm-ipdv-09, "IP Packet Delay Variation Metric for IPPM", Internet Society Network Working Group, (Apr. 2002), pp. 1-31.

Vern Paxson and Sally Floyd, "Why We Don't Know How to Stimulate the Internet", University of California, (Dec. 1997), pp. 1-8.

Edwin M. Knorr and Raymond T. Ng, "Algorithms for Mining Distance-Based Outliers in Large Datasets", University of British Columbia, (1998), pp. 1-12.

Vern Paxson, Measurments and Analysis of End-to-End Internet Dynamics, University of California, (Apr. 1997), pp. 1-392.

Tianhang Hou, Lloyd C. Huff, and Larry Mayer, "Automatic Detection of Outliers in Multibeam Echo Sounding Data", University of New Hampshire, pp. 1-12 (May 2001).

Igor V. Cadez and P.S. Bradley, "Model BAsed Population Tracking and Automatic Detection of Distribution Changes" pp. 1-8 (2001).

Edwin M. Knorr and Raymond T. Ng, "A Unified Approach for Mining Outliers", Universityof British Columbia, pp. 1-13 (Sep. 1997.

Mark Last and Abraham Kandel, Automated Detection of Outliers in Real-World Data, pp. 1-10 (Aug. 2001.

Dantong Yu, Gholam Sheikholeslami and Aidong Zhang, "Find Out: Finding Outliers in Very Large Datasets", University of New York at Buffalo, pp. 1-19 (Oct. 2002).

Hiroyuki Ohsaki, Mitsushige Morita and Masayuki Murata, "Measurment-Based Modeling of Internet Round-Trip Time Dynamics using System Identification", pp. 1-20 (May 2002).

Polly Huang, Anja Feldmanm and Walter Willinger, "A non-intrusive, wavelet-based approach to detecting network performance problems", pp. 1-15 (Sep. 2001).

V. Raisanen, G. Grotefeld & A. Morton, draft-ietf-ippm-npmps-07 "Network Performance measurement With Periodic Streams", Internet Society, pp. 1-31 (Nov. 2002).

Vern Paxson and Sally Floyd, "Why We Don't Know How to Stimulate the Internet", University of California, (Dec. 1997), pp. 1-8.

J. Mahdavi and V. Paxson, "IPPM Metrics for Measuring Connectivity," RFC 2678, Internet Society, pp. 1-10 (Sep. 1999).

Floyd Bullard, "A Brief Introduction to Bayesian Statistics", pp. 1-14, NCTM 2001.

Tianhang Hou, Lloyd C. Huff, and Larry Mayer, "Automatic Detection of Outliers in Multibeam Echo Sounding Data", University of New Hampshire, pp. 1-12, May 22-May 24, 2001.

Igor V. Cadez and P.S. Bradley, "Model BAsed Population Tracking and Automatic Detection of Distribution Changes" pp. 1-8, 2001.

Edwin M. Knorr and Raymond T. Ng, "A Unified Approach for Mining Outliers", Universityof British Columbia, pp. 1-13, 1997.

Mark Last and Abraham Kande, Automated Detection of Outliers in Real-World Data, pp. 1-10, 1999.

Dantong Yu, Gholam Sheikholeslami and Aidong Zhang, "Find Out: Finding Outliers in Very Large Datasets", University of New York at Buffalo, pp. 1-19, 1999.

Hiroyuki Ohsaki, Mitsushige Morita and Masayuki Murata, "Measurement-Based Modeling of Internet Round-Trip Time Dynamics using System Identification", pp. 1-20, 2002.

Polly Huang, Anja Feldmann and Walter Willinger, "A non-intrusive, wavelet-based approach to detecting network performance problems", pp. 1-15, 2001.

Matthew Mathis, Jeffrey Semke and Jamshid Mahdavi, "The Macroscopic Behavior of the TCP Congestion Avoidance Algorithm", ACM SIGCOMM, vol. 27, No. 3, (Jul. 1997), pp. 1-16.

Nevil Brownlee and Chris Loosley, "Fundamentals of Internet Measurement: A Tutorial" Keynote, (May 01, 2001) pp. 1-14.

M. Mathis and M. Allman, RFC 3148 "A Framework for Defining Empirical Bulk Transfer Capcity Metrics", Internet Society (Jul. 2001), pp. 1-16.

G. Almes, S. Kalidindi and M. Zekauskas, RFC 2681 "A Round-Trip Delay Metric for IPPM", Internet Society (Sep. 1999), pp. 1-20.

G. Almes, S. Kalidindi and M. Zekauska, RFC 2680 "A One-Way Packet Loss Metric for IPPM", Internet Society (Sep. 1999), pp. 1-15.

G. Almes, S. Kalidindi and M. Zekauska, RFC 2679 "A One-Way Delay Metric for IPPM", Internet Society (Sep. 1999), pp. 1-20.

V. Paxson et al., RFC 2330 "Framework for IP Performance Metrics" Internet Society, (May 1998), pp. 1-40.

Vern Paxson, "End-to-End Routing Behavior in the Internet", University of California, (May 23, 1996), pp. 1-23.

"Handbook for Statistical Analysis of Environment Background Data", Naval Facilities Engineering Command, (Jul. 1999). pp. 1-83.

Surendra P. Verma, "Sixteen Statistical Tests for Outlier Detection and Rejection in Evaluation of International Geochemical Reference Materials: Example of Microgabbro PM-S", Geostandards Newsletter, vol. 21, No. 1, (Jun. 1997) pp. 59-75.

Kenneth C. Glossbrenner, Approved Text for new Recommendation I.380: "Internet Protocol Data Communication Service- IP Packet Trnasfer and Availability Performance Parameters", (May 3, 1999), pp. 1-28.

V. Raisanen, G. Grotefeld & A. Morton, draft-ietf-ippm-npmps-07 "Network Performance measurement With Periodic Streams", Internet Society, pp. 1-31, Apr. 2002 .

Rajeev Koodli & R. Raukanth draft-ieft-ippm-loss-pattern-07, "One-Way Loss Pattern Sample Metrics", Internet Society IPPM Working Group, (Mar. 28, 2002), pp. 1-23.

C. Demichelis & P. Chimento draft-ietf-ippm-ipdv-09, "IP Packet Delay Variation Metric for IPPM", Internet Society Network Working Group, (Apr. 2002), 1-31.

Vern Paxson and Sally Floyd, "Why We Don't Know How to Simulate the Internet", University of California, (Dec. 1997), pp. 1-8.

Edwin M. Knorr and Raymond T. Ng, "Algorithms for Mining Distance-Based Outliers in Large Datasets", University of British Columbia, (1998), pp. 1-12.

Vern Paxson, Measurements and Analysis of End-to-End Internet Dynamics, University of California, (Apr. 1997), pp. 1-392.

* cited by examiner

METHOD FOR REAL-TIME AUTO-DETECTION OF OUTLIERS

FIELD OF THE INVENTION

The present invention relates to a method for automatically determining outliers in a time series of data in real-time.

BACKGROUND

Outliers are generally regarded as observations that deviate so much from other observations of the same dataset as to arouse suspicions that they were generated by a different mechanism. See, e.g., Edwin M. Knorr and Raymond T. Ng., "Algorithms for Mining Distance-Based Outliers in Large Datasets", Proc. $24^{th}$ VLDB Conf. (New York 1998). The presence of outliers in a dataset can make statistical analyses difficult because it is often unclear as to whether the outlier should be properly included in any such analysis. For example, one must often ask questions such as:

a. Was the value entered correctly or was there an error in the data entry?
b. Were there any experimental problems associated with the suspect value?
c. Is the outlier caused by natural diversity? If so, the outlier may be a correct value.

After answering such questions, one must decide what to do with the outlier. One possibility is that the outlier was due to chance, in which case the value should probably be kept in any subsequent analyses. Another possibility is that the outlier was due to a mistake and so it should be discarded. Yet another possibility is that the outlier was due to anomalous or exceptional conditions and so it too should be discarded. The problem, of course, is that one can never be sure which of these possibilities is correct.

No mathematical calculation will, with certainty, indicate whether the outlier came from the same or different population than the other members of the dataset. But statistical treatments can help answer this question. Such methods generally first quantify how far the outlier is from the other values in the dataset. This can be the difference between the outlier and the mean of all points, the difference between the outlier and the mean of the remaining values, or the difference between the outlier and the next closest value. Often, this result is then normalized by dividing it by some measure of scatter, such as the standard deviation of all values, of the remaining values, or the range of the data. The normalized result is then compared with a chart of known values to determine if the result is statistically significant for the population under test.

A well-known example of the above-described type of statistical calculation is Grubbs' method for assessing outliers. Note that this test does not indicate whether or not a suspect data point should be kept for further consideration, only whether or not that data point is likely to have come from the same (presumed Gaussian) population as the other values in the group. It remains for the observer to decide what to do next.

The first step in the Grubbs' test is to quantify how far the outlier is from the other data points. This is done by calculating a ratio Z, as the difference between the suspected outlier and the population mean, divided by the standard deviation of the population (computed by considering all values, including the suspect outlier). If Z is large, the value under test is considered to be far from the others.

$$Z = \frac{|mean - value|}{SD}$$

Determining whether or not Z is large requires that the calculated Z value be checked against reference charts. This is necessary because Z cannot ever get truly large in an absolute sense. Because the suspected outlier increases both the calculated standard deviation and the difference between the value and the mean, no matter how the data are distributed, it has been shown that Z can not get larger than $(N-1)/\sqrt{N}$, where N is the number of values. For example, if N=3, Z cannot be larger than 1.555 for any set of values.

Recognizing this fact, Grubbs and others have tabulated critical values for Z which are used to determine whether the Z calculated for the suspected outlier is statistically significant. Thus, if the calculated value of Z is greater than the critical value in the table, then one may conclude that there is less than a 5% chance that one would encounter an outlier so far from the other data points in the population (in either direction) by chance alone, if all the data were really sampled from a single Gaussian distribution. In other words, there is a 95% probability that the outlier under test does not belong to the population.

Note that this method only works for testing the most extreme value in a sample. Note also that if the outlier is removed, one cannot simply test the next most extreme value in a similar fashion. Instead, Rosner's test should be used. In any event, once an outlier has been identified, it remains for the observer to choose whether or not to exclude that value from further analyses. Or the observer may choose to keep the outlier, but use robust analysis techniques that do not assume that data are sampled from Gaussian populations.

Other methods for determining outliers include various partitioning algorithms, k-means algorithms, hierarchical algorithms, density-based algorithms, clustering techniques, and so on. What is lacking, however, is a straightforward approach that is not computationally intensive so that it can be applied automatically, in real-time.

SUMMARY OF THE INVENTION

Outliers are determined according to a procedure wherein a moving window of data is used to determine a local baseline as a moving average of the data under test, weighted by the number of measurements in each time interval and, in some cases, a damping factor. Once the moving average has been computed, a next measurement associated with a next time interval is compared to a value associated with the baseline to determine whether or not the next measurement should be classified as an outlier with respect to the baseline. In some cases, for example where the time series of the data shows small variability around a local mean, the next measurement is compared to a multiple of the weighted moving average to determine if the next measurement should be classified as an outlier. In other cases, for example where the time series of the data shows significant variability around the local mean, the next measurement is compared to the sum of the weighted moving average and a multiple of a moving root mean square deviation value weighted by the number of measurements in each time interval and, in some cases, a damping factor.

BRIEF DESCRIPTION OF THE DRAWINGS

The present invention is illustrated by way of example, and not limitation, in the figures of the accompanying drawings in which.

DETAILED DESCRIPTION

Figure 1:
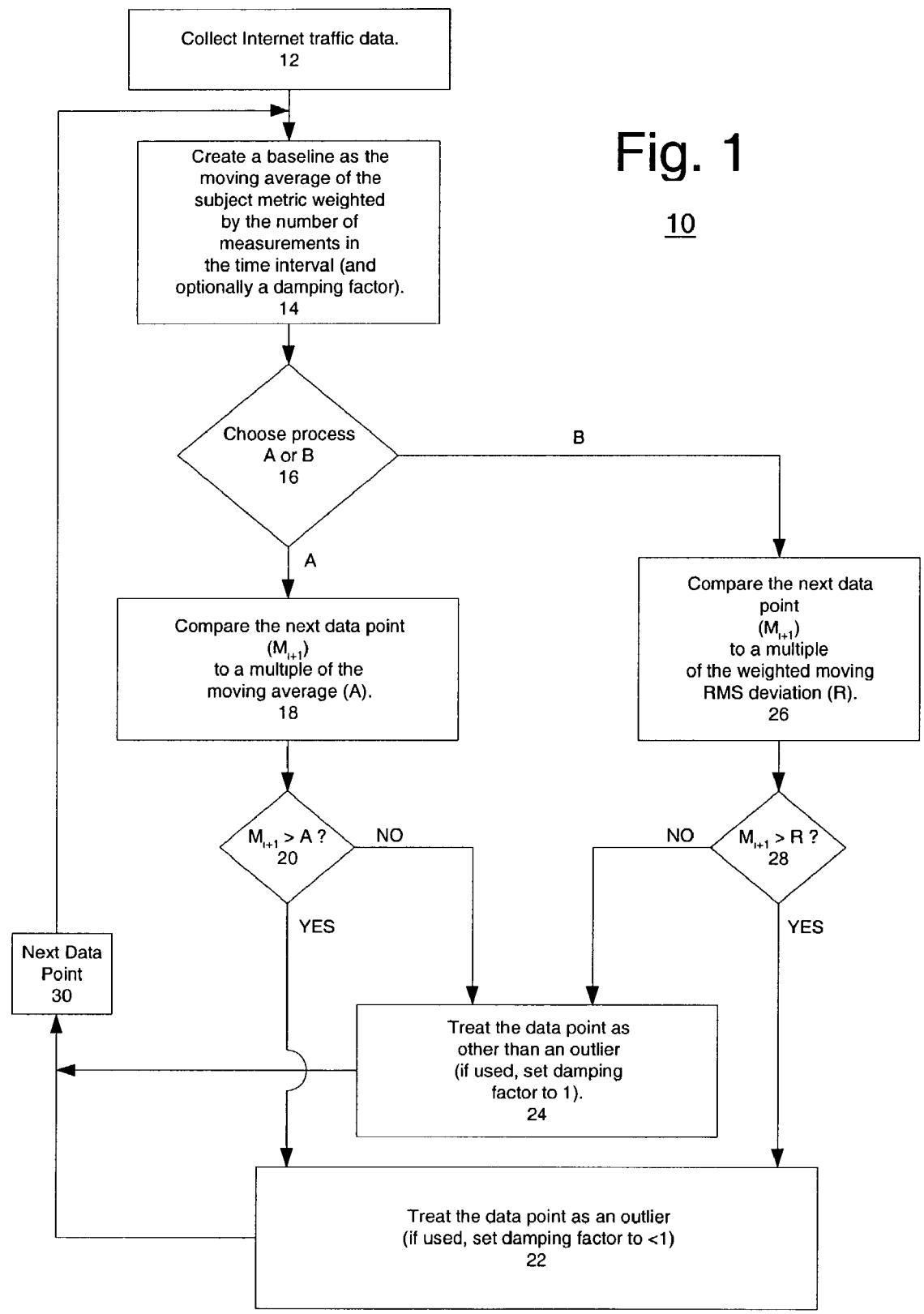
FIG. 1 illustrates an example of processes for automatically determining outliers in a time series of data in accordance with the present invention.

Described below is a method for automatically detecting outliers in a time series of data in real-time. By way of example, the present methods may be used to detect duration outliers in duration data collected for Internet connections. Such outliers may be indicative of congestion episodes in a network. Congestion in this context is defined as anomalous deviations in the end-to-end response time or duration of a connection. These anomalies (i.e., the duration outliers) indicate times when the average duration over a given time interval exceeds a threshold value. When one or more contiguous time intervals are each characterized by duration outliers, then the total interval time may be referred to as a congestion episode.

The present methods may also be applied to a number of different performance metrics that may be used in assessing network performance. The Internet Engineering Task Force (IETF) has defined a number of network performance metrics in a series of Requests for Comments (RFCs) as follows:

a. RFC 2330, entitled "Framework for IP Performance Metrics" (May 1998), define a general framework for particular metrics to be developed by the IETF's IP Performance Metrics effort, begun by the Benchmarking Methodology Working Group (BMWG) of the Operational Requirements Area, and being continued by the IP Performance Metrics Working Group (IPPM) of the Transport Area.

b. RFC 2678, entitled "IPPM Metrics for Measuring Connectivity" (September 1999), defines a series of metrics for connectivity between a pair of Internet hosts. It builds on notions introduced and discussed in RFC 2330, the IPPM framework document.

c. RFC 2679, entitled A One-way Delay Metric for IPPM" (September 1999), defines a metric for one-way delay of packets across Internet paths.

d. RFC 2680, entitled "A One-way Packet Loss Metric for IPPM" (September 1999), defines a metric for one-way packet loss across Internet paths.

e. RFC 2681, entitled "A Round-trip Delay Metric for IPPM" (September 1999), defines a metric for round-trip delay of packets across Internet paths.

f. A draft RFC entitled "IP Packet Delay Variation Metric for IPPM" (April 2002) refers to a metric for variation in delay of packets across Internet paths. The metric is based on the difference in the One-Way-Delay of selected packets. This difference in delay is called "IP Packet Delay Variation".

g. A draft RFC entitled "One-Way Loss Pattern Sample Metrics" (March 2002) uses the base loss metric defined in RFC 2680 to define two derived metrics, "loss distance" and "loss period", and the associated statistics that together capture loss patterns experienced by packet streams on the Internet. The authors postulate that the loss pattern or loss distribution is a key parameter that determines the performance observed by the users for certain real-time applications such as packet voice and video. For the same loss rate, two different loss distributions could potentially produce widely different perceptions of performance.

h. A draft RFC entitled "Network Performance Measurement with Periodic Streams" (April 2002) describes a periodic sampling method and relevant metrics for assessing the performance of IP networks.

These examples of various performance metrics are not meant to be restrictive.

FIG. 1 illustrates a process 10 that includes examples of the present methods. The process begins with a time series of collected data. In the illustrated example, Internet traffic data are used. Thus, the data may include round trip time measurements, file size measurements, packet loss measurements, duration measurements, and/or data regarding other network traffic metrics. Such data can be gathered (12) in a variety of ways. For example, when installed in a network the NP-1000 Internet Traffic Manager™ produced by Network Physics, Inc. of Mountain View, Calif., the assignee of the present invention, is capable of monitoring and recording a wide range of network metrics, which can be displayed via tables, charts, and topological diagrams. Of course, the present method are applicable to any time series of data and the examples of network performance metrics are set forth merely to provide context for the remaining discussion.

At 14, a moving window of data is used to determine a local baseline, measured as a moving average of the subject metric, weighted by the number of measurements in each time interval. In some cases, a damping factor may be introduced in order to suppress the effect of outliers. Thus, letting $\mu$ be the moving average of the subject metric, and $M_i$ be the average of that metric for time interval i with $N_i$ measurements, $$\mu = \frac{\sum_i N_i \cdot d_i \cdot M_i}{\sum_i N_i \cdot d_i}$$

where i is summed over all time intervals within the moving window.

The damping factor $d_i$ is less than 1 if the metric $M_i$ is detected as an outlier for the time interval i. As indicated this damping factor is introduced to suppress outliers from abruptly shifting the moving average, while providing a mechanism for baseline adjustment if the data over a long time scale has dramatically shifted in mean value. In one implementation, d=1/W, where W is the window size or the number of time intervals in the given moving window.

Once the moving average is calculated for a given window (14), the metric measurement of the next interval ($M_{i+1}$) may be compared to this moving average to determine if it is an outlier. There are several techniques by which this comparison can be performed (decision block 16), two of which will be discussed in detail.

The first process for comparing the next metric measurement to the moving average (shown in the illustration as process A) compares the next measurement ($M_{i+1}$) to a multiple of the moving average (n·µ), where typical values of n include 1.5, 2 and 2.5) to determine if that measurement ($M_{i+1}$) is an outlier (see block 18). If the measurement exceeds this outlier threshold (see decision block 20), then the measurement may be considered an outlier (block 22). Otherwise, the measurement is not treated as an outlier (block 24).

Figure 2:
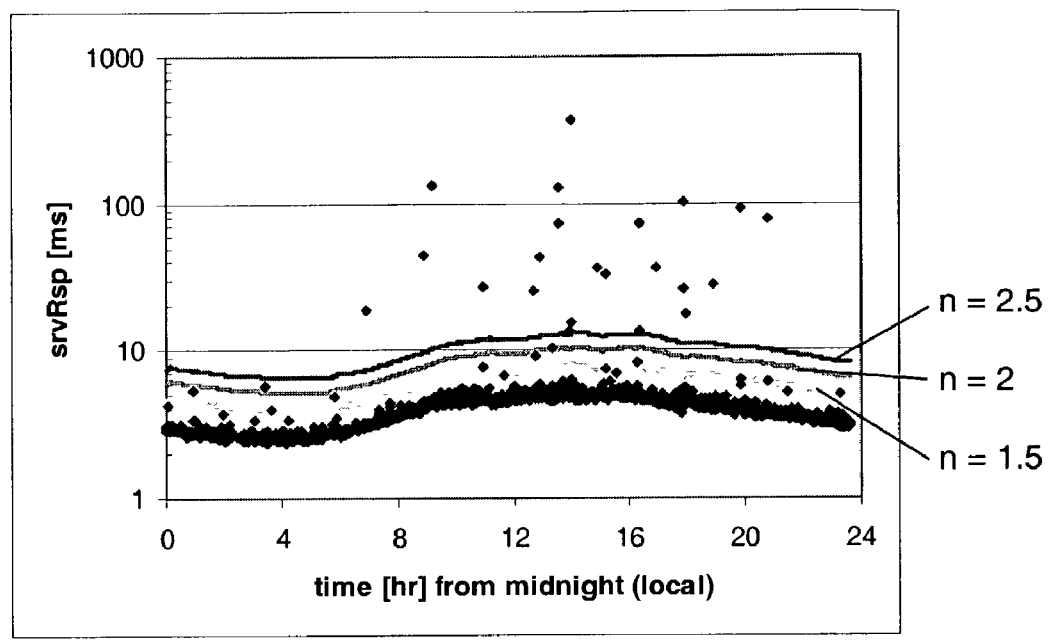
FIG. 2 is a scatter plot showing outlier thresholds for a set of data using different multiplier values for a moving average in accordance with one embodiment of a process for automatically determining outliers in a time series of data.

This first process is effective where the time series in general exhibits small variability around the local mean. FIG. 2 is a scatter plot showing the outlier thresholds for a set of data (representing server response times at various times of day) using the three different values of n discussed above. Notice that as n increases, the outlier threshold also increases; resulting in fewer data points being classified as outliers.

The second process illustrated in FIG. 1 (shown as process B) compares the next metric measurement $M_{i+1}$ to a multiple of the moving root-mean-square (RMS) deviation, σ, weighted by the number of measurements in each time interval and, where applicable, a damping factor (see block 26). In this process, $$\sigma = \sqrt{\frac{\sum_i N_i d_i (M_i - \mu)^2}{\sum_i N_i d_i}}$$

If the measurement ($M_{i+1}$) exceeds µ+mσ, (block 28) then the measurement may be considered an outlier (22). Otherwise, it is not considered an outlier (24). Typical values for m are 2, 3 and 4.

Figure 3:
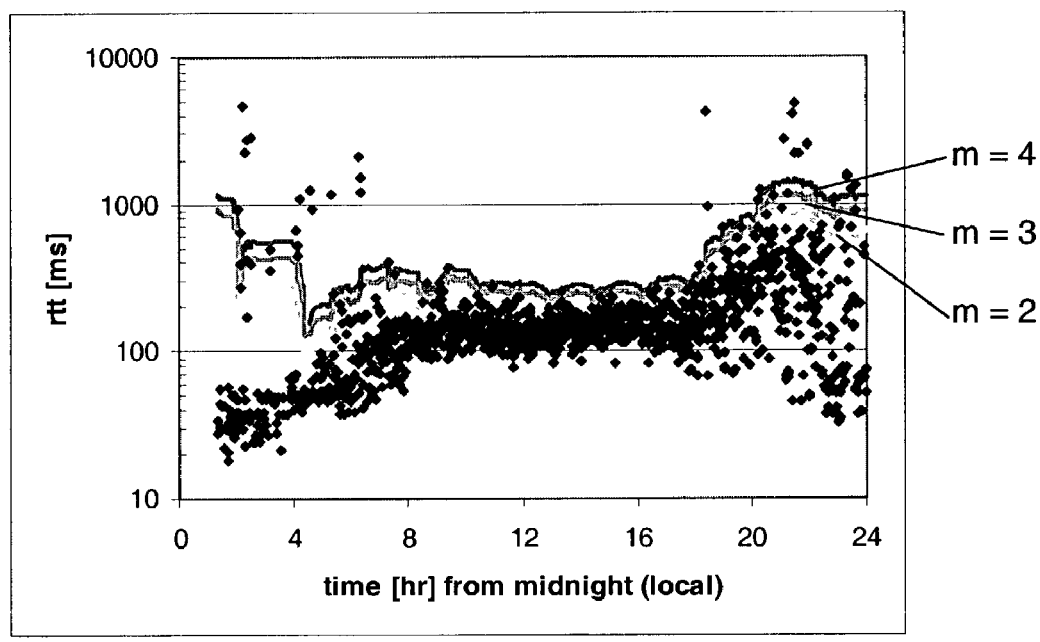
FIG. 3 is a scatter plot showing the outlier thresholds for a set of data using different multiplier values for a root mean square deviation in accordance with one embodiment of a process for automatically determining outliers in a time series of data.

FIG. 3 is a scatter plot showing the outlier thresholds for a set of data (representing round trip times at various times of day) using the three different values of m discussed above. Notice that as m increases, the outlier threshold also increases; resulting in fewer data points being classified as outliers. This second method is effective when the time series of data points exhibits significant variability around the local mean.

Returning to FIG. 1, once the decision regarding whether or not to treat the subject measurement as an outlier has been made (blocks 22 and 24), the next data point can be considered (30). The procedure can repeat for all of the measurements collected or for a subset thereof, as required. Because the computational intensity of this procedure is light, it can be performed in real-time, i.e., as data is collected.

Thus, a method for automatically detecting outliers in a time series has been described. However, although the above description included examples of presently preferred techniques, it should be remembered that the true scope of the invention should only be measured in terms of the claims, which now follow.

What is claimed is:

1. A machine implemented method for assessing performance of a network, comprising:
    collecting data through the network, wherein the data include measurements of a metric to assess the performance of the network;
    determining, for a number of the measurements of the metric within a plurality of time intervals, a baseline that includes computing a moving average of the measurements of the metric weighted by the number of measurements in each time interval, wherein the moving average comprises a result of dividing a first sum, over all time intervals, of a first product of the number of measurements for each time interval multiplied by values of the measurements within each time interval multiplied by a damping factor, by a second sum, over all time intervals, of a second product of the number of measurements for each time interval multiplied by the damping factor;
    comparing a next metric measurement associated with a next time interval to the baseline that includes the moving average, to determine whether or not the next metric measurement should be classified as an outlier with respect to the baseline;
    after determining whether or not the next metric measurement should be classified as the outlier with respect to the baseline, moving to a next data point of the measurements of the metrics; and
    repeating the determining and the comparing for the next data point to automatically detect outliers in real time as the data is collected.

2. The method of claim 1 wherein the metric comprises a network performance metric.

3. The method of claim 2 wherein the metric is selected from the group comprising round trip time, server response time, packet loss, duration and file size.

4. The method of claim 1 wherein the next metric measurement is compared to the baseline that includes a multiple of the weighted moving average, to determine if the next metric measurement should be classified as an outlier.

5. The method of claim 4 wherein if the next metric measurement exceeds the multiple of the weighted moving average the next metric measurement is classified as an outlier.

6. The method of claim 5 wherein the multiple comprises 1.5, 2 or 2.5.

7. The method of claim 1 wherein the damping factor comprises a mathematical inverse of the number of time intervals.

8. The method of claim 1 wherein the next metric measurement is compared to the baseline that includes a multiple of a moving root mean square deviation value weighted by the number of measurements in each time interval.

9. The method of claim 8 wherein the moving root mean square deviation value is further weighted by a damping factor.

10. The method of claim 9 wherein the damping factor comprises a mathematical inverse of the number of time intervals.

11. The method of claim 8 wherein the multiple comprises 2, 3 or 4.

12. The method of claim 8 wherein if the next metric measurement exceeds a sum of the moving average and a multiple of the weighted root mean square deviation value, the next metric measurement is classified as an outlier.

13. The method of claim 12 wherein the multiple comprises 2, 3 or 4.

14. The method of claim 12 wherein the metric comprises a network performance metric.

15. The method of claim 4 wherein the metric comprises a network performance metric.

16. The method of claim 1 wherein the determining and comparing procedures are repeated using further metric measurements in place of the next metric measurement.

17. A machine readable medium containing executable instructions which when executed by a computer cause the computer to automatically in real time assess a performance of a network by performing operations comprising:

collecting data through a network, wherein the data include measurements of a metric;

determining, for a number of the measurements of the metric within a plurality of time intervals, a baseline that includes computing a moving average of the measurements of the metric weighted by the number of measurements in each time interval, wherein the moving average comprises a result of dividing a first sum, over all time intervals, of a first product of the number of measurements for each time interval multiplied by values of the measurements within each time interval multiplied by a damping factor, by a second sum, over all time intervals, of a second product of the number of measurements for each time interval multiplied by the damning factor;

comparing a next metric measurement associated with a next time interval to the baseline that includes the moving average, to determine whether or not the next metric measurement should be classified as an outlier with respect to the baseline;

after determining whether or not the next metric measurement should be classified as the outlier with respect to the baseline, moving to a next data point of the measurements of the metrics; and repeating the determining and the comparing for the next data point to automatically detect outliers in real time as the data is collected.

18. The machine readable medium of claim 17 wherein the metric comprises a network performance metric.

19. The machine readable medium of claim 18 wherein the metric is selected from the group comprising round trip time, server response time, packet loss, duration and file size.

20. The machine readable medium of claim 17 wherein the next metric measurement is compared to the baseline that includes a multiple of the weighted moving average, to determine if the next metric measurement should be classified as an outlier.

21. The machine readable medium of claim 20 wherein if the next metric measurement exceeds the multiple of the weighted moving average the next metric measurement is classified as an outlier.

22. The machine readable medium of claim 21 wherein the multiple comprises 1.5, 2 or 2.5.

23. The machine readable medium of claim 17, wherein the damping factor comprises a mathematical inverse of the number of time intervals.

24. The machine readable medium of claim 17 wherein the next metric measurement is compared to the baseline that includes a multiple of a moving root mean square deviation value weighted by the number of measurements in each time interval.

25. The machine readable medium of claim 24 wherein the moving root mean square deviation value is further weighted by a damping factor.

26. The machine readable medium of claim 25 wherein the damping factor comprises a mathematical inverse of the number of time intervals.

27. The machine readable medium of claim 24 wherein the multiple comprises 2, 3 or 4.

28. The machine readable medium of claim 24 wherein if the next metric measurement exceeds a sum of the moving average and a multiple of the weighted root mean square deviation value, the next metric measurement is classified as an outlier.

29. The machine readable medium of claim 28 wherein the multiple comprises 2, 3 or 4.

30. The machine readable medium of claim 28 wherein the metric comprises a network performance metric.

31. The machine readable medium of claim 20 wherein the metric comprises a network performance metric.

32. The machine readable medium of claim 17 wherein the determining and comparing procedures are repeated using further metric measurements in place of the next metric measurement.

* * * * *